Oct. 13, 1936.  C. J. WERNER  2,057,175
MOTOR CIRCUIT
Filed Feb. 7, 1935
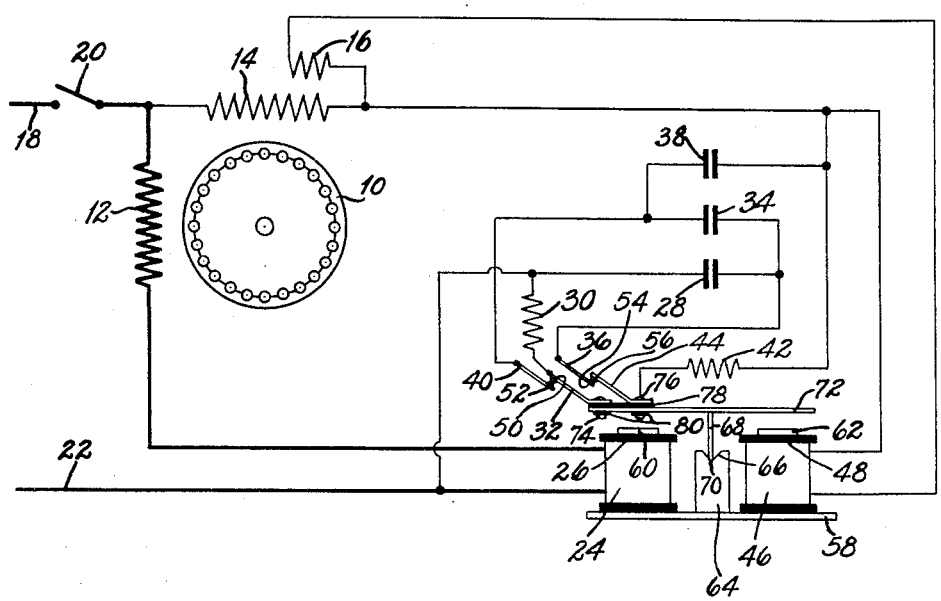
INVENTOR
Calvin J. Werner
BY
his ATTORNEYS Patented Oct. 13, 1936

2,057,175

UNITED STATES PATENT OFFICE 2,057,175

MOTOR CIRCUIT

Calvin J. Werner, Dayton, Ohio, assignor to General Motors Corporation, Detroit, Mich., a corporation of Delaware Application February 7, 1935, Serial No. 5,324

4 Claims. (Cl. 172—233)

This invention relates to motor circuits, and more particularly to a circuit for starting and operating single phase motors.

It is well known in the art that condensers have been used in series with one winding of a split phase motor to produce a field that is out of time and space phase with the main field, and through this means produce a resultant rotating field that will cause the rotor of the motor to start rotating. It is also well known that the capacity of the condensers should be changed in order to obtain the best operating characteristics when the motor has gained speed, because the rotor, when running, has two currents that are out of phase produced therein due to the transformer and rotational voltages, and a rotating magnetic field is thereby inherently produced.

In previous starting circuits of this nature, however, the condensers have been so connected that a change in transformer ratio is necessary to effect the proper change in effective capacity, thus necessitating a transformer in the starting circuit; or else condensers have been utilized for starting that are idle and effectively out of the circuit after the motor is running. In the latter case, the condenser or condensers that remain in the circuit must be built to stand continuously the line voltage plus the voltage induced in the winding. Another type of circuit utilizes a pair of condensers for starting and running; but completely opens the condenser circuit during switching and subjects the condensers to surges.

An object of this invention is to provide a system for starting and operating single phase motors which utilizes a plurality of condensers in the auxiliary field winding circuit, and the means for changing the condensers from series to parallel combination relative to each other, and to provide means for limiting the value of the discharge current of the condensers that may occur when the circuit of the condensers is changed.

Another object of this invention is to provide the system for starting and operating single phase motors which, while providing any or all of the characteristics set forth above, also has electromagnetic means for effecting the control thereof.

Still another object of this invention is to provide a system for starting and operating single phase motors which, while being economical to build, has considerable flexibility of design.

Further objects and advantages of the present invention will be apparent from the following description, reference being had to the accompanying drawing wherein a preferred embodiment of the present invention is clearly shown.

In the drawing:

The single figure of the drawing is a schematic diagram of a motor circuit embodying a preferred form of the present invention.

With particular reference to the drawing, a conventional squirrel cage type of motor rotor 10 is magnetically associated with a main field winding 12 and an auxiliary field winding 14. A third winding or coil 16 is magnetically associated with the rotor 10, so that the rotor flux cuts the coil 16 when the rotor is energized and rotating. This winding or coil 16 is preferably not a field winding, and for convenience and operating efficiency is preferably and conveniently wound in the same slots of the motor stator as those occupied by a portion of the auxiliary field winding 14. One end of the main field winding 12 is connected to an end of the auxiliary field winding 14, and to a power supply line 18 through a switch 20. The other end of the main field winding 12 is connected to the power supply line 22 through a winding 24 of an electromagnet 26. The power supply line 22 is also connected to one side of a condenser 28, and through a resistor or impedance 30 to a movable switch member 32. The other side of the condenser 28 is connected to one side of a condenser 34 and to a stationary switch member 36. The other side of the condenser 34 is connected to one side of a condenser 38 and to a stationary switch member 40. The other side of the condenser 38 is connected through a resistor or impedance 42 to a movable switch member 44, and to the end of the auxiliary field winding 14 opposite the end of that winding that is connected to the main field winding 12. The end of the auxiliary field winding 14 that is connected to the movable switch member 44 and one side of the condenser 38 is also connected to one end of the third winding or coil 16, this connection being made to save a separate connecting lead to one of the windings. A winding 46 of an electromagnet 48 is connected across the third winding or coil 16. Switch members 32 and 40 have contacts 50 and 52 respectively, mounted thereon and in alignment for engagement; while switch members 36 and 44 have contacts 54 and 56 respectively, mounted thereon and in alignment for engagement.

The electromagnets 26 and 48 are preferably mounted on a base 58, so that they are separated somewhat from each other, and preferably so that their cores 60 and 62 respectively, are substantially parallel. A support member 64 is secured at the base 58 intermediate the electromagnets 26 and 48, and preferably has a bifurcated end 66 in which a member 68 is pivotally supported by an anti-friction bearing, as at 70, or by other suitable means. The member 68 is secured to, and supports an armature 72, which armature extends from the member 68 so that it is magnetically associated with the cores 60 and 62, and so that the electromagnets 26 and 48 opposingly coact upon the armature. The movable switch members 32 and 44 are secured to one end of the armature 72 by rivets 74 and 76 respectively, or other suitable fastening means, and are each preferably insulated from the armature by insulating material, as indicated at 78 and 80. The armature, being pivotally mounted at 70, can rock toward either the electromagnet 26 or the electromagnet 48, depending upon the relative magnetic forces exerted by the electromagnets upon the armature. When the armature is urged toward the electromagnet 26, the movable contacts 50 and 56 engage the stationary contacts 52 and 54 respectively. When the armature is urged toward the electromagnet 48, the contacts become disengaged.

In the operation of this system or circuit, the operating current is applied to the motor through the power supply lines 18 and 22 when the switch 20 is closed. The electromagnet winding 24 preferably has relatively few turns of comparatively heavy wire, and since this winding is connected in series with the main field winding 12, the electromagnet 26 is energized as soon as the switch 20 is closed. The electromagnet 26 thus urges the armature 72 toward the core 60 and biases it in that direction to effect engagement of the contacts 50 and 52 and the contacts 54 and 56. The engagement of these contacts connects the condensers 28, 34 and 38 in parallel, and thus puts a high capacity in series with the auxiliary field winding between that field winding and the power supply line 22. As the rotor begins to rotate, transformer and rotational voltages are induced therein to produce rotor currents, which currents in turn produce flux that cuts the winding or coil 16 to induce a voltage in that winding of coil, and as the rotor speed increases, the voltage across the winding or coil 16 increases. The electromagnet winding 46 preferably has more turns and a higher impedance than the winding of the electromagnet 26. The winding or coil 16 and the electromagnet winding 46 are so designed that when the rotor speed reaches a predetermined value, the force of the electromagnet 48 that is exerted upon the armature 72 effects this disengagement of the contacts 50 and 52 and the contacts 54 and 56. The counter E. M. F. induced in the main winding by the rotor flux effects a reduction in the current through the electromagnet winding 24 to aid in the operation of the switch. When the contacts are disengaged, the condensers are connected in series circuit relation, in series with the auxiliary field winding 14, so that the capacity in series with that field winding is effectively and considerably reduced when the rotor reaches the predetermined speed.

It may be noted that when the switching from parallel to series, and vice versa, of the condensers occurs the polarity of at least one of the condensers is changed. When the condensers are switched from series to parallel circuit combination, and if the condensers are charged when that switching occurs, the condenser or condensers that have their polarity changed discharge through the switch contacts. It has been found desirable, in order to reduce the rate of condenser discharge, and to reduce spark discharges at the contacts, to provide resistors or impedances 30 and 42 in series with the switch contacts to effect those results.

While the embodiment of the present invention as herein disclosed, constitutes a preferred form, it is to be understood that other forms might be adopted, all coming within the scope of the claims which follow.

From the foregoing description of the structure and mode of operation of this motor circuit, it is apparent that in at least one aspect of the invention, it comprises a motor circuit including a rotor 10; a main field winding 12; an auxiliary field winding 14; a plurality of condensers 28, 34 and 38 connected in the circuit of one of the field windings (14); switching means 50, 52, 54 and 56 for changing the circuit relation of the condensers 28, 34 and 38 relative to each other, the polarity of at least one of the condensers 28, 34 and 38 being changed when switching occurs; and means 30 and 42 for limiting the current value of the discharge of the condenser 28, 34 or 38 upon change of the polarity thereof.

Among the advantages of this motor circuit are the following:

(1) All of the condensers used in starting are utilized during running at a reduced voltage of safe value.

(2) The condensers are switched without opening the circuit to the starting winding.

(3) The condensers and switch are protected by means for limiting the value of discharge when switching occurs.

What is claimed is as follows:

1. A motor circuit comprising, in combination, a rotor; a main field winding; an auxiliary field winding having one end connected to an end of the main field winding; a power line connected to the common ends of the main and auxiliary field windings; a second power line connected to the other end of the main field winding; a reactance circuit comprehending an odd number of condensers greater than one connected between the second power line and the other end of the auxiliary field winding; said reactance circuit including means for switching the condensers from parallel to series circuit combination without breaking the reactance circuit; protective means included in the said reactance circuit for limiting the rate of condenser discharge when the condensers are switched from series to parallel circuit combination; and means for actuating the means for switching.

2. A motor circuit comprising, in combination, a rotor; a main field winding; an auxiliary field winding having one end connected to an end of the main field winding; a power line connected to the common ends of the main and auxiliary field windings; a second power line connected to the other end of the main field winding; a reactance circuit comprehending an odd number of condensers greater than one connected between the second power line and the other end of the auxiliary field winding; said reactance circuit including means for switching the condensers from parallel to series circuit combination; resistors included in the reactance circuit for limiting the rate of condenser discharge occurring at the switching; and electromagnetic means for actuating the means for switching.

3. A single phase motor circuit comprising, in combination, a rotor; a main field winding, an auxiliary field winding; a coil magnetically coupled with the rotor; a plurality of condensers connected in the circuit of one of the field windings; switching means for changing the circuit relation of the condensers relative to each other, the polarity of at least one of the condensers being changed when switching occurs; electromagnetic means responsive to the voltage across the coil for actuating the switching means; and means for limiting the current value of the discharge of the condenser upon change of the polarity thereof.

4. A single phase motor circuit comprising, in combination, a rotor; a main field winding; an auxiliary field winding; a plurality of condensers connected in the circuit of one of the field windings; switching means for changing the circuit relation of the condensers relative to each other, the polarity of at least one of the condensers being changed when switching occurs; and means for limiting the current value of the discharge of the condenser upon change of the polarity thereof.

CALVIN J. WERNER.